United States Patent [19]

Thoma

[11] 4,199,021
[45] Apr. 22, 1980

[54] THERMAL ENERGY STORAGE APPARATUS

[75] Inventor: Paul E. Thoma, Burlington, Wis.

[73] Assignee: Johnson Controls, Inc., Milwaukee, Wis.

[21] Appl. No.: 744,695

[22] Filed: Nov. 24, 1976

[51] Int. Cl.$^2$ ............................................. F28F 21/00
[52] U.S. Cl. ..................................... 165/1; 126/400; 165/104 S; 252/70
[58] Field of Search ............... 165/1, 104 S, DIG. 4, 165/32; 126/400, 271; 252/70

[56] References Cited

U.S. PATENT DOCUMENTS

| | | | |
|---|---|---|---|
| 2,677,243 | 5/1954 | Telkes | 165/DIG. 4 |
| 2,677,664 | 5/1954 | Telkes | 126/400 X |
| 2,936,741 | 5/1960 | Telkes | 126/400 X |
| 3,093,308 | 6/1963 | Snelling | 165/32 X |
| 3,363,675 | 1/1968 | Bierhoff | 165/104 S X |
| 3,952,519 | 4/1976 | Watson | 165/104 S X |

*Primary Examiner*—Albert W. Davis, Jr.
*Attorney, Agent, or Firm*—Andrus, Sceales, Starke & Sawall

[57] ABSTRACT

A thermal energy storage apparatus and method employs a container formed of soda lime glass and having a smooth, defect-free inner wall. The container is filled substantially with a material that can be supercooled to a temperature greater than 5° F., such as ethylene carbonate, benzophenone, phenyl sulfoxide, Di-2-pyridyl ketone, phenyl ether, diphenylmethane, ethylene trithiocarbonate, diphenyl carbonate, diphenylamine, 2-benzoylpyridine, 3-benzoylpyridine, 4-benzoylpyridine, 4-methylbenzophenone, 4-bromobenzophenone, phenyl salicylate, diphenylcyclopropenone, benzyl sulfoxide, 4-methoxy-4PR-methylbenzophenone, N-benzoylpiperidine, 3,3PR,4,4PR,5 pentamethoxybenzophenone, 4,4'-Bis-(dimethylamino)-benzophenone, diphenylboron bromide, benzalphthalide, benzophenone oxime, azobenzene. A nucleating means such as a seed crystal, a cold finger or pointed member is movable into the supercoolable material. A heating element heats the supercoolable material above the melting temperature to store heat. The material is then allowed to cool to a supercooled temperature below the melting temperature, but above the natural, spontaneous nucleating temperature. The liquid in each container is selectively initiated into nucleation to release the heat of fusion. The heat may be transferred directly or through a heat exchange unit within the material.

9 Claims, 4 Drawing Figures

THERMAL ENERGY STORAGE APPARATUS

BACKGROUND OF THE INVENTION

This invention relates to a thermal energy storage apparatus and particularly to an apparatus for storing thermal energy in the form of heat of fusion for extended period of storage.

Energy storing systems have been suggested to permit storage of the thermal energy from a suitable source during low peak usage periods or when such energy is available for subsequent use as necessary. The rather serious questions which have recently developed with respect to the availability and cost of natural resources in the world have increased the interest in development of heat storage systems, particularly those which are useful to store solar energy and the like.

Although many different thermal storage energy systems have been suggested, basically three different storage types are available and can be generally classified as (1) liquid storage, (2) solid or packed bed storage, and (3) phase change storage.

Liquid storage systems widely employ water as the thermal energy storage medium. The thermal energy is stored by heating of the liquid and storing it within a suitable thermally insulated container. The solid or packed storage system generally operates in a similar manner but employs rocks, pebbles and the like which are heated to store the energy. Phase change energy storage employs materials which are changed in phase, generally to a gaseous state from a liquid state or to a liquid state from a solid state. For example, certain systems of the first type employ conversion of water to steam. Systems of the second type employ conversion of a sodium salt to a liquid in accordance with the well-known equation: $Na_2SO_4.10H_2O \rightarrow Na_2SO_4 + 10H_2O$. Although such devices have been suggested, the various designs generally have certain inefficiencies and complexities connected with the storage and recovery of energy.

SUMMARY OF THE PRESENT INVENTION

The present invention is particularly directed to an improved thermal energy storage system employing a supercooled storage medium in which the energy is stored as the heat of fusion for an indefinite period of time. Generally in accordance with the present invention, a supercoolable material is held within a suitale container means. The supercoolable material is selected to have a supercooled liquid state of at least five degrees of supercooling below the normal melting temperature. The material is such that when in the supercooled liquid state, solidification or freezing can be initiated by spontaneous nucleation or by use of a nucleating device such as a cold element, a seed crystal, or a sharp pointed object. In the storage of energy, the material is heated to its melting temperature to form a liquid body above the melting temperature. The liquid body is then allowed to cool to a temperature below the melting temperature, that is to the temperature of the surrounding environment. As the supercoolable liquid cools below the melting temperature, it does not freeze or change state but rather supercools in the liquid state to the temperature of the surroundings. This characteristic is generally defined as creating a metastable state of the liquid, with the reference to the normal same freezing and melting temperature of most liquids. For example, reference may be made to Van Nostrand's Scientific Encyclopedia, 3rd Ed., published in 1958 D. Van Nostrand Company, Inc. of New Jersey or McGraw-Hill's Dictionary of Scientific and Technical Terms, Copyright 1974, McGraw-Hill Book Company, USA. In the supercooled state, the liquid stores thermal energy as the heat of fusion of the supercoolable liquid and will maintain the storage over practical periods of indefinite length. To recover such heat, it is merely necessary to nucleate the liquid, thereby causing a rapid freezing or solidification with a corresponding liberation of the heat stored therein. Nucleation is accomplished by any suitable means such as the cold element, seed crystal or sharp pointed object.

More particularly, the material employed should be capable of significant supercooling in the liquid state in order to store a significant quantity of thermal energy and is preferably operable at relatively high temperature such as the environmental temperatures. The melting temperature is preferably as high as practical and the natural or spontaneous nucleating temperature should be as low as practical.

The supercooled liquid in most embodiments must be capable of being selectively initiated into nucleation to release the heat of fusion and to release such heat over a reasonable recovery time period. A supercoolable liquid upon the initial nucleation heats up and, if sufficient heat energy is present, rapidly increases to the melting temperature. However, the supercooled liquid will not increase above the melting temperature but will continue to more slowly solidify and give up the heat of fusion until completely solidified and then will cool to the ambient temperature. The material, the associated container and nucleating components must be chemically stable and pure to prevent contamination and uncontrolled nucleation of the material. The container preferably also has a smooth interior surface to avoid uncontrolled nucleation and release of the thermal energy.

Although any supercoolable material can be employed, available materials which have characteristics particularly adapted to this present invention include ethylene carbonate, benzophenone, phenyl sulfoxide, Di-2-pyridyl ketone, phenyl ether, diphenylmethane, ethylene trithiocarbonate, diphenyl carbonate, diphenylamine, 2-benzoylpyridine, 3-benzoylpyridine, 4-benzoylpyridine, 4-methylbenzophenone, 4-bromobenzophenone, phenyl salicylate, diphenylcyclopropenone, benzyl sulfoxide, 4-methoxy-4pr-methylbenzophenone, N-benzoylpiperidine, 3,3pr,4,4pr,5 pentamethoxybenzophenone, 4,4'-Bis-(dimethylamino)-benzophenone, diphenylboron bromide, benzalphthalide, benzophenone oxime, azobenzene and the like with greater than 5° F. supercooling. Mixtures of such materials with each other and with other materials which form a eutectic composition will also provide supercoolable character. The materials generally operated at elevated temperatures and thus are conveniently stored in natural environments. For example, ethylene carbonate spontaneously solidifies at approximately 45° F., ethylene trithiocarbonate solidifies at approximately 50° F., and benzophenone solidifies at a temperature below −20° F. These materials are available commercially and the ambient storage temperature is readily held above such a spontaneous solidification temperature for storage. Phenyl salicylate similarly functions with a somewhat longer period of freezing and, therefore, timed release of thermal energy.

In a highly practical system, for example, used for heat storage and selective release, 4-benzoylpyridine may be the supercoolable material. A satisfactory container means is a soda lime glass formed as a suitable smooth wall container. A suitable nucleating means such as pointed member, a seed crystal source or a rod-like element coupled to a cooling means is secured to the container for entry into the supercoolable material. A heating unit is incorporated into the assembly, such as a part of the container. A heat transfer conduit means is supported within the container and, in particular, within the supercoolable material and connected through suitable valving to a fluid transport output line containing an efficient heat transfer fluid. In operation, the heating unit is energized and the solid material heated to above its melting temperature. The liquid is then cooled below its melting temperature but above its spontaneous solidification temperature storing thermal energy. When heat is to be withdrawn from the supercooled liquid, the valving system is open to pass the transfer medium through the immersed conduit means and simultaneously the supercooled liquid is nucleated by activation of the nucleating element. The supercooled liquid freezes over a period of time which generally varies with the particular supercoolable material and thereby generates and releases the heat of fusion over a corresponding period. The time release of the thermal energy provides a source of energy which is transferred to the transfer medium in the conduit means. The unit is regenerated by again actuating the heating means to completely melt the material to above its melting temperature and then allowing the material to supercool to again store thermal energy.

In a highly practical thermal storage system, a plurality of individual cells such as described above are provided. The conduit means are connected to the main transfer system with inlet and by-pass valving means for selectively connecting of a cell in series with the main transfer line. Whenever heat is desired, a single cell may be connected into the system. When additional heat is desired and the heat has been wholly or partially withdrawn from a first cell, additional cell or cells may be connected into the system. When the energy of a cell has been depleted, such cell is disconnected and regenerated immediately or at an appropriate later time.

In other applications, other heating means, storage means and heat transfer means may of course be employed. For example, a hot pad suitable for medical or therapeutic application may be constructed using a supercooling material, such as benzophenone, contained in a sealed plastic bag. A nucleating device such as a pointed rod may be secured in an attached pocket having a self-sealing gland between the pocket and bag proper. When the hot pad is to be used, the nucleating device is pushed through the self-sealing gland to initiate nucleation of the material. After nucleation, the nucleating device may be retracted. The heat generated as a result of freezing is applied to a desired location by placing the plastic bag over the desired location with the container wall providing the heat transfer means. When the heat is completely expended, the entire bag with supercooling liquid is subjected to a suitable heat source such as an oven to obtain the liquid state again. By selection of a suitable supercoolable material, a temperature responsive comfort unit can be provided. Thus, an outdoor comfort pad may be provided by selecting a supercoolable material with a spontaneous nucleating temperature encountered in northern climates.

The present invention provides a relatively simple and reliable energy storage means and method having a large capacity for storing of thermal energy for indifinite periods in combination with a convenient and practical means of selective recovery of such energy.

DESCRIPTION OF THE ILLUSTRATED EMBODIMENT

Figure 1:
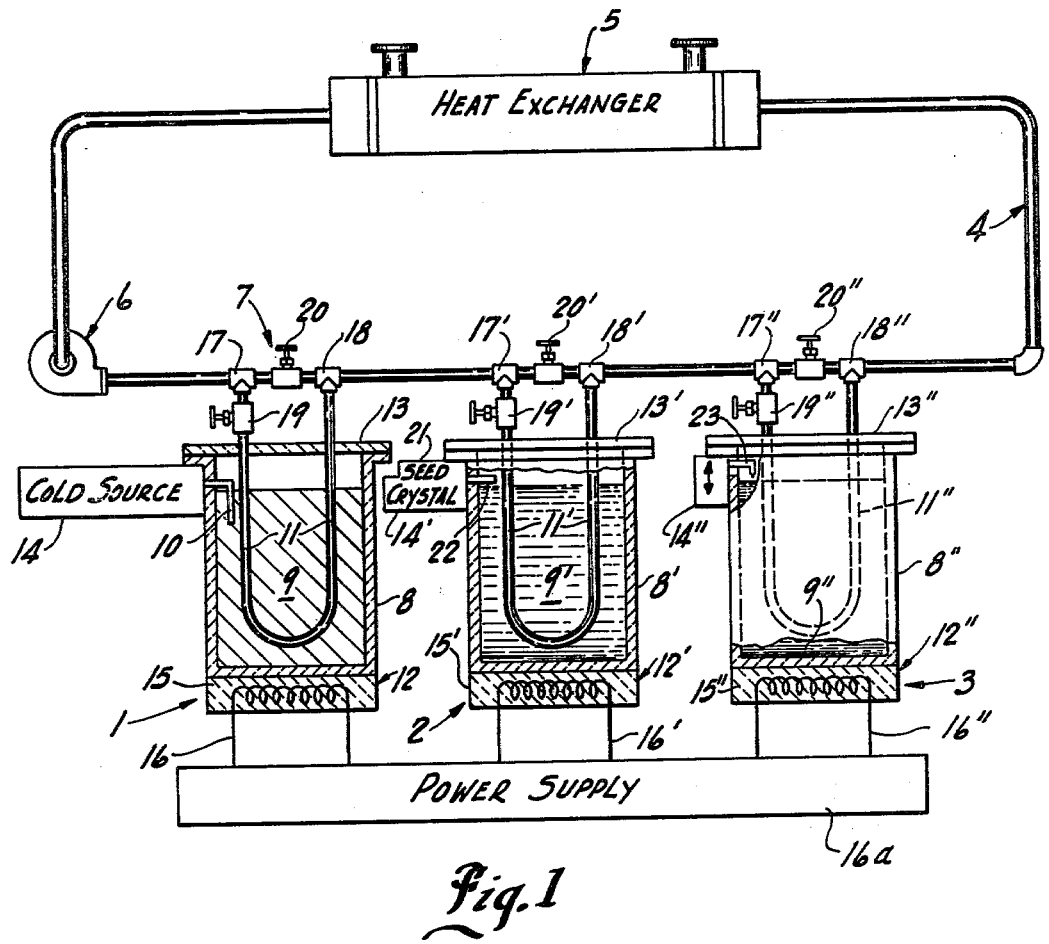
FIG. 1 is an illustration of a thermal storage energy system constructed in accordance with the present invention.

Referring to the drawing, the illustrated embodiment of the invention in FIG. 1 includes three thermal energy storage cells or units, 1, 2, and 3, each of which is similarly constructed in accordance with the teaching of the present invention. The three cells 1-3 are similarly connected to a main heat transfer line 4 which is connected to circulate a heat exchange medium to a thermal load device 5 for supplying of thermal energy to the load device. A pump 6 is shown for circulating of a suitable liquid through line 4 and load 5. For example, the load device 5 may be a part of a room heating system for conditioning of the room air. The thermal energy storage cells 1-3 are similarly connected to the main transfer line 4 through similar valving systems 7 for selective withdrawal of thermal energy, in accordance with any suitable automatic or manual control.

The illustrated cells 1-3 are essentially similarly constructed and cell 1 will be described in detail with corresponding elements of cells 2 and 3 identified by corresponding prime and double prime numbers for simplicity and clarity of explanation.

Generally, in accordance with the illustrated embodiment of the invention, the thermal energy storing cell 1 includes a container 8 in which a supercoolable material 9 is confined. A nucleating device 10 is secured within the container 8 and is operable to trigger the supercoolable material 9 when in a supercooled liquid state, into nucleation with a freezing of the supercooled liquid and the release of thermal energy. A conduit 11 is mounted within the container 8 passing through the supercoolable material 9 and selectively connected to the heat transfer line 4 for circulating of the transfer liquid through the conduit 11 for transfer of the heat from the nucleated supercooled material 9 to the load 5.

The cell 1 further includes a suitable heating unit 12 to convert nucleated and solidified material 9 to a liquid state above its melting temperature.

The present invention is particularly directed to the storage means. The heat exchange load 5 and interconnecting system to cells 1-3 is, therefore, diagrammatically illustrated and no further description of a particular load or the like is given other than to clearly explain the illustrated embodiment of the present invention.

The material 9 may be of any suitable supercoolable material. A supercoolable material 9 is capable of being placed and maintained in a solid state to a given melting temperature level and alternately in a total liquid state upon reaching such level. Further, material 9 maintains the liquid state even when cooled in the liquid state to below its melting temperature, which may be referred to in the art as the freezing temperature, but above a spontaneous freezing temperature. Thus, supercooling of most supercoolable liquids to a particular level, identified as the spontaneous nucleating temperature, results in spontaneous freezing and solidification of the material 9, with a resulting release of the heat stored in the liquid. The material in accordance with the present invention is selected with a significant supercooling capability and generally at least five °F. and preferably greater for providing a substantial level of energy storage.

The supercooled liquid in addition to spontaneous nucleation is also capable of being triggered into freezing or fusion while above the spontaneous nucleating temperature in a controlled manner by other than cooling to the spontaneous nucleating temperature, and thereby producing a timed release of the thermal energy upon initiation of the freezing of the supercooled liquid. The supercoolable liquid may also be triggered to solidify by initiating solidification at a point or limited area. For example, an element at a temperature below the spontaneous nucleating temperature of the material placed in the material may initiate the process which will then rapidly propagate through the entire mass. Similarly, a starting seed crystal may be introduced or even a sharp pointed instrument inserted in the liquid will act as a trigger means to initiate the nucleating and solidifying process. The supercooled liquid rather rapidly begins to solidify from the initiating means, rising to the melting temperature if sufficient energy is present. However, the supercooled liquid cannot be heated above its melting temperature and, consequently, after rising to the melting temperature, the supercooled liquid decreases in solidification rate, with timed release of thermal energy. The trigger means may be removed after the process is started because of the self propagating characteristic thereof. However, in heating and storing of the energy, the material must be in a complete liquid state as any solid portion would function as a seed crystal and immediately reverse the process upon removal of the heat.

In operation of the illustrated embodiment of FIG. 1, the heating units 12 are activated to heat the solid material 9 of the several cells 1-3 to above the melting temperature for a sufficient period to totally melt the solid material to a liquid and further heating of the liquid to a temperature above its melting temperature. The liquid is then cooled to below its melting temperature but above the natural or spontaneous nucleating temperature and thereby storing of thermal energy within the liquid.

If heat is desired, the valving system is opened to connect the desired cell 1-3 into the transfer line 4 and simultaneously the nucleating device 10 is activated to trigger the supercooled liquid which nucleates and freezes, liberating the heat of fusion and producing a timed release of thermal energy. The liquid passing through the transfer conduit 11 absorbs this liberated heat and transfers it to the main system and particularly to the load device 5.

More particularly, the proper construction of container 8 for the supercoolable material 9 constitutes a significant feature for proper functioning of the cell. Thus, the inner surface of the container 9 for most supercoolable liquids must be smooth and essentially free of all imperfections. As noted previously, supercooled liquids can generally be triggered into nucleation by a sharp pointed object. A sharp imperfection on the inner surface of the container 8 could constitute a nucleating means which would generate uncontrolled nucleating and freezing of the liquid. Contamination of the supercoolable material 9 may also result in uncontrolled nucleating similar to the addition of a seed crystal. The container therefore is preferably sealed to protect the material and constructed with an inner smooth wall which does not chemically react with the supercoolable material 9.

In the illustrated embodiment, the container 8 is shown as a cylindrical tank having a removable cover 13, through which the conduit 11 passes. In a practical system, the container 8 may be formed of a soda lime glass, which is readily formed as a smooth and essentially imperfection free container and which will not react with the supercoolable material. For example, particularly satisfactory supercoolable materials include benzophenone, 4-benzoylpyridine and ethylene carbonate for application of normal environmental conditions. Ethylene carbonate, for example, has a convenient melting temperature of 96° F. and can be readily supercooled to a temperature of around 50° F. without solidification. The carbonate also has a relatively high heat of fusion being on the order of 2.40 kilocalories/mole, and has a heat capacity of 40.6 calories/1° C. mole.

Although any other supercoolable material having a supercooling differential of at least 5° F. and preferably higher may be employed, the above materials provide a very satisfactory and practical embodiment of the present invention. Thus, materials which have been employed in heat storage systems, including the above, are listed in the following table with the supercooling characteristic:

|     |                          | Melting Point Temp. | Lowest Temp. Liq. | Difference |
| --- | ------------------------ | ------------------- | ----------------- | ---------- |
| 1.  | Ethylene Carbonate       | 96                  | 45                | 51         |
| 2.  | Benzophenone             | 117                 | ↓ −20 ↑           | 137        |
| 3.  | Phenyl Sulfoxide         | 156                 | 44                | 112        |
| 4.  | Dl-2-Pyridyl Ketone      | 131                 | −8                | 139        |
| 5.  | Phenyl Ether             | 80.6                | 17                | 63.6       |
| 6.  | Diphenylmethane          | 79                  | 24                | 55         |
| 7.  | Ethylene Trithiocarbonate| 93                  | 50                | 43         |
| 8.  | Diphenyl Carbonate       | 175                 | 154               | 21         |
| 9.  | Diphenylamine            | 129                 | 87                | 42         |
| 10. | 2-Benzoylpyridine        | 111                 | ↓ −25 ↑           | 136        |
| 11. | 3-Benzoylpyridine        | 104                 | ↓ −25 ↑           | 129        |
| 12. | 4-Benzolypyridine        | 160                 | 27                | 133        |
| 13. | 4-Methylbenzophenone     | 135                 | ↓ −20 ↑           | 155        |
| 14. | 4-Bromobenzophenone      | 180                 | 100               | 80         |

-continued

| | | Melting Point Temp. | Lowest Temp. Liq. | | Difference |
|---|---|---|---|---|---|
| 15. | Phenyl Salicylate | 108 | ↓ −32 | ↑ | 140 |
| 16. | Diphenylcyclopropenone | 248 | 220 | | 28 |
| 17. | Benzyl Sulfoxide | 275 | 260 | | 15 |
| 18. | 4-Methoxy-4Pr-Methylbenzophenone | 196 | | | |
| 19. | N-Benzoylpiperidine | 122 | ↓ −25 | ↑ | 148 |
| 20. | 3,3Pr,4,4Pr,5 Pentamethoxybenzophenone | 247 | Turns to Glass | | |
| 21. | 4,4'-Bis-(Dimethylamino)-Benzophenone | 348 | 217 | | 131 |
| 22. | Diphenylboron Bromide | 77 | ↓ −33 | ↑ | 100 |
| 23. | Benzalphthalide | 221 | 150 | | 71 |
| 24. | Benzophenone Oxime | 290 | 170 | | 120 |
| 25. | Azobenzene | 156 | 120 | | 36 |

The arrows in the table indicate the temperature state is above (↑) or below (↓) the indicated reading. Further, the material which when cooled turns to glass may be triggered into solidification for use in certain applications. The inventor's analysis of the above materials has found that the several materials have a characteristic chemical structure which would appear to provide a theoretical explanation of the supercooling characteristic. Thus, each of the material structures include a generally defined pocket or recess-like portion and a projecting element or multiple element line, with the pocket portion and projecting portions of different electronegativity. Although the two dimensional illustration of the chemical structures of several materials may not clearly indicate this structure, the structure is clearly seen in a three dimensional model or illustration. In the liquid state the molecules are probably arranged with mating projecting and pocket portions which form a relatively strong stable state. The energy or stress necessary to break the bond is created only when the liquid has been substantially cooled below the melting temperature, i.e., to the spontaneous nucleating temperature, or when an auxiliary means is introduced which initiates the release within the material. Once initiated, the process would reasonably be self-propagating.

Various nucleating means may be used. The illustrated nucleating device 10 for unit 1 is finger-like member secured to the inner wall of the container 8 and projecting downwardly into the upper level of the supercoolable material 9. The finger-like member 10 is connected to a suitable refrigeration source 14 and constitutes a coolable finger or element which, when activated, readily initiates nucleation of the supercooled liquid and starts the timed release of the thermal energy from the supercooled liquid, with the solidification of the material 9.

The illustrated resistance heater 12 includes an insulating outer sheel 15 integrated into the underside of the container 8. A heating element 16 is embedded in shell 15 and connected to a suitable electrical power source 16a for selective energization and melting of the supercoolable material 9. Any other conventional or desired heating source such as solar energy, heating flames and the like can, of course, be employed to provide a suitable source of heat capable of heating the material to above its melting temperature.

The conduit 11 is illustrated as a simple loop, with the opposite ends connected by suitable T-couplings 17 and 18 and to spaced points of the transfer tube. The valving means 7 includes an inlet valve 19 connected in the upstream end or side of the exchange conduit 11. Valve 19 is normally a closed valve and prevents the circulation of the transfer or exchange liquid through the conduit 11. A normally open bypass valve 20 is connected in the transfer line 4 between the inlet and outlet ends of the conduit 11. Thus, the inlet valves 19, 19' and 19" are normally closed while valves 20, 20' and 20" are normally open such that the transfer liquid circulates directly from the upstream side to the downstream, by-passing the three cells 1–3.

Upon a demand for heat, the first cell 1 is connected into the system by closing of an in-line normally open valve 20 and opening of the cell inlet normally closed valve 19. The exchange liquid now passes downwardly through the tube 11. Simultaneously, the finger-like member 10 is activated, resulting in a nucleation of the supercoolable liquid 9 with the self-propagating and rapid freezing and solidification of liquid 9 until the total mass reaches an elevated temperature or the melting temperature of the supercooled liquid, at which time the solidification rate reduces to that necessary to hold the mass at the melting temperature. When the total mass is solidified, it begins to cool. The solidifying mass thus provides a timed release of energy over the corresponding period of solidification and cooling. The liberated heat is transferred and absorbed by the heat transfer liquid passing through the U-shaped tube 11 in cell 1. When the total liberated heat has been transferred, or if it is not providing sufficient heat, the second or third cell 2 or 3 can be similarly connected into the system. Generally, the heat cells 1–3 are individually and sequentially interconnected with any previously connected cell disconnected. For example, if cell 2 is to be connected, the second in-line valve 20' would be closed and the first in-line valve 20 opened thereby by-passing the first cell 1 and connecting the second cell 2 into the system. The inlet valve 19 of cell 1 would be closed simultaneously with the opening of the inlet valve 19' of the second cell 2.

Other means than the cold member 10 for nucleating supercoolable material of liquid masses may, of course, be employed. For example, referring to container 2, the nucleating means 14' may include a source of seed crystals 21 with a suitable means 22 for transfer of a seed crystal or crystals to the supercoolable liquid 9'. A further alternative is shown in FIG. 1 wherein the nucleating means associated with container 3 is a pointed finger or member 23 which is mounted for vertical movement into the material 9". Both the seed crystal and the pointed member 23 when inserted into the materials 9' and 9" create a nucleating center from which the solidification of the supercooled liquid propagates with a timed release of the stored thermal energy as previously described.

The embodiment of FIG. 1 illustrates a practical large energy storage system. The heating means for heating the material, the heat transfer means and the like may, of course, be of any other suitable construction. For example, a solar energy collector may be provided and coupled to the storage elements through any suitable means for heating and melting of the supercoolable material.

Figures 2, 3, 4:
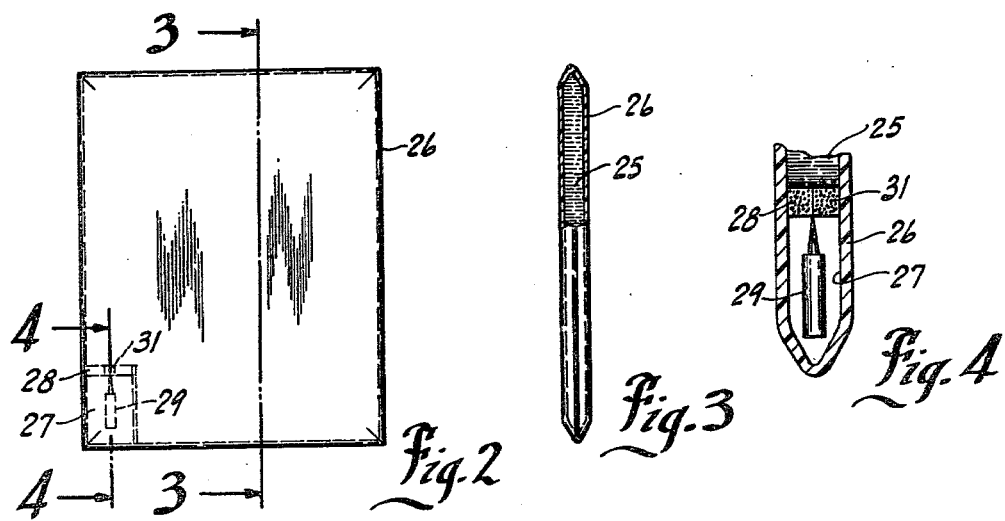
FIG. 2 is an illustration of a hot pad constructed in accordance with the present invention.
FIG. 3 is a vertical section taken generally on line 3—3 of FIG. 2.
FIG. 4 is an enlarged sectional view taken generally on line 4—4 of FIG. 2.

FIGS. 2–4 illustrate a further embodiment of the invention in which a supercoolable material 25 is sealed within a flexible plastic bag 26 formed of relatively thin plastic to permit ready transfer of heat through the wall. The bag 26 is shaped similarly to a hot pad unit such as is used in medical and therapeutic applications. A satisfactory material for such an application may be benzophone. The bag 26 is formed with an integral small pocket 27 with an apertured interconnecting wall 28 to the chamber housing the material 25. A suitable nucleating means such as pointed rod 29 is housed within pocket 27 and is adapted to be manually introduced into the material 25 through the aperture in wall 28. The aperture is closed by a self-sealing gland 31 or other suitable means which prevents escape of the material 25 while permitting insertion and retraction of nucleating element 29. When the hot pad is to be used, the nucleating device is pushed through the self-sealing gland to initiate nucleation of the material. After nucleation, the nucleating device may be retracted. The heat generated as a result of freezing is applied to a desired location by placing the plastic bag over the desired location with the container wall providing the heat transfer means. When the heat is completely expended, the entire bag with the supercooling liquid is subjected to a suitable heat source such as an oven to obtain the liquid state again.

In certain applications and by appropriate material selection, the trigger or auxiliary nucleating means may be eliminated. For example, a comfort unit for use in cold climates by spectators attending outdoor sports, hunters and the like may be constructed within the broadcast teaching of this invention. Ethylene carbonate would be a suitable material contained in a sealed plastic bag or vest. Thermal energy is stored in the material by heating the bag or vest contents in an oven or the like and allowing the liquid to cool to room temperature. In a typical application, the user takes the bag or vest with the supercooled liquid outdoors for example to a ballpark on a cold day. If the temperature drops to the spontaneous nucleating temperature, the supercooling liquid freezes and liberates heat thereby providing heat to the person. The bag or vest is regenerated by placing it in an oven to melt the supercooling material so that it becomes a liquid.

The material and apparatus for carrying out the invention are readily and conveniently available and the operating system may be formed of a relatively simple activating and regenerating element.

The described apparatus thus provides a reliable system and apparatus for storage of thermal energy, having a large capacity and an efficient storage of the energy.

The invention provides a device and method for an essentially indefinite storage of heat in relatively large quantities at most ambient temperatures substantially below the heat application temperature with selective release of the stored heat by controlled nucleation solidification.

Various modes of carrying out the invention are contemplated as being within the scope of the following claims, particularly pointing out and distinctly claiming the subject matter which is regarded as the invention.

I claim:

1. In the method of storing and charging of thermal energy in an apparatus having fluid exchange means coupled to the apparatus, comprising the improvement in the use of an organic supercoolable material having a significant level of supercooling in the liquid state, said material being an organic material having three dimensional molecular structure including a charge pocket and a mating projection of different electronegativity establishes a strong stable liquid state, and selectively initiating the nucleation of the supercooled liquid and freezing of the supercooled liquid with a rate of nucleation and release of heat in excess of the normal rate of dissipation of the heat.

2. The method of claim 1 wherein said initiating of the nucleation includes introducing of a coolable member into the material.

3. The method of claim 1 wherein said initiating of the nucleation includes introducing of a pointed member into the material.

4. In the method of claim 1 wherein said organic material is a single material selected from the group consisting of ethylene carbonate, benzophenone, 4-benzoylpyridine.

5. In the method of claim 1 wherein said material is selected from the group consisting of benzophenone, phenyl sulfoxide, Di-2-Pyridyl ketone, phenyl ether, diphenylmethane, ethylene trithiocarbonate, diphenyl carbonate, diphenylamine, 2-benzoylpyridine, 3-benzoylpyridine, 4-benzoylpyridine, 4-methylbenzophenone, 4-bromobenzophenone, phenyl salicylate, diphenylcyclopropenone, benzyl sulfoxide, 4-methoxy-4pr-methylbenzophenone, N-benzoylpiperidine, 3,3pr,4,4pr,5 pentamethoxybenzophenone, 4,4'-Bis-(dimethylamino)-benzophenone, diphenylboron bromide, benzalphthalide, benzophenone oxime, azobenzene.

6. In the method of claim 1 wherein said supercoolable material has at least 5° F. supercooling differential.

7. In the method of claim 1 wherein said supercoolable material is separated into a plurality of individual masses, said heat exchange means being selectively coupled to each of said plurality of individual masses, said masses being selectively nucleated to freeze the corresponding liquid and release the heat of fusion to said heat exchange means.

8. In the method of claim 1 providing a heating unit secured in heat transfer relationship to the container for said material.

9. In the method of claim 1 including forming of a plurality of separate masses of said material, and selectively initiating said nucleation to provide selective recovery of the thermal energy from said separate masses.

* * * * *

UNITED STATES PATENT AND TRADEMARK OFFICE
CERTIFICATE OF CORRECTION

PATENT NO. : 4,199,021

DATED : April 22, 1980

INVENTOR(S) : PAUL E. THOMA

It is certified that error appears in the above-identified patent and that said Letters Patent are hereby corrected as shown below:

Column 6, Line 15    After "container" cancel "9" and substitute therefore --- 8 ---;

Column 7, Line 9    After "196" insert in column headed "Lowest Temp. Liq." --- 155 --- and also insert in column headed "Difference" ---- 41 ---.

Signed and Sealed this

Twelfth Day of August 1980

[SEAL]

Attest:

SIDNEY A. DIAMOND

Attesting Officer    Commissioner of Patents and Trademarks